May 13, 1924.
E. DEISTER
VEHICLE TIRE
Filed Dec. 23, 1922
1,493,922
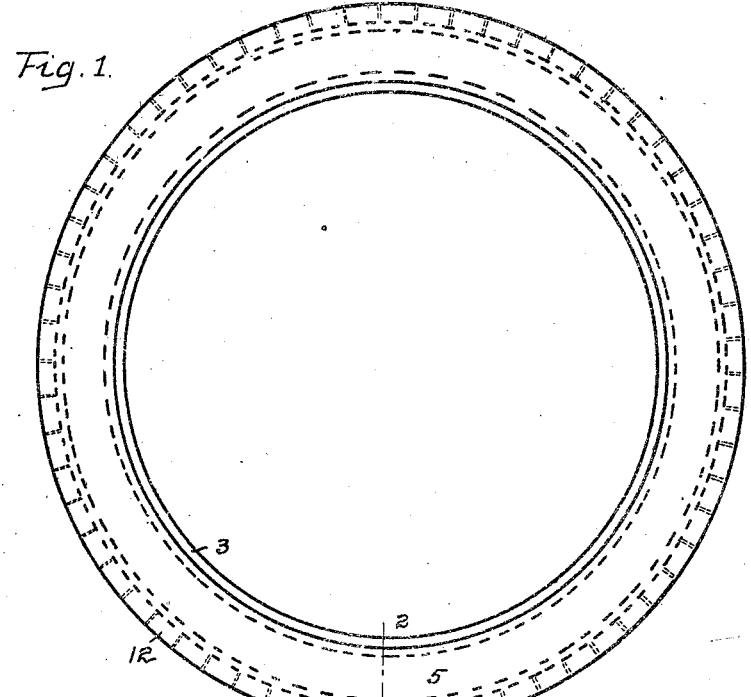
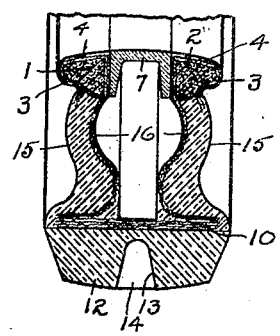
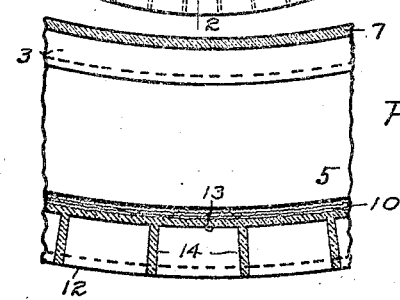
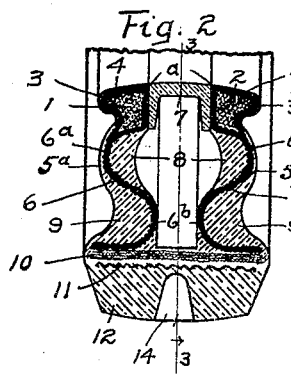
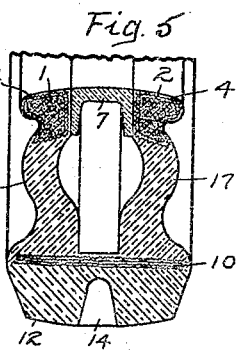
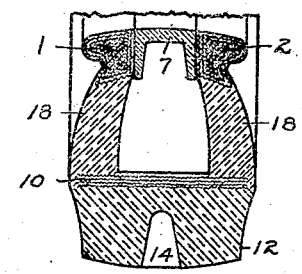
Emil Deister
Inventor
by Elwin M. Hulse
Attorney.

Patented May 13, 1924.

1,493,922

UNITED STATES PATENT OFFICE.

EMIL DEISTER, OF FORT WAYNE, INDIANA.

VEHICLE TIRE.

Application filed December 23, 1922. Serial No. 608,624.

*To all whom it may concern:*

Be it known that I, EMIL DEISTER, a citizen of the United States, residing at Fort Wayne, in the county of Allen and State of Indiana, have invented new and useful Improvements in Vehicle Tires, of which the following is a specification.

The invention relates to tires and particularly to tires for motor vehicles.

Heretofore numerous attempts have been made to form a tire which shall have all the valuable characteristics of the well known pneumatic tire without having its troublesome features, but so far as I am aware, no successful tire has been constructed that will accomplish this object, mainly because the resilience of the pneumatic tire was not duplicated in the non-pneumatic tire.

The object of my invention is to provide a tire, non-pneumatic in character, having a resilience substantially equal to that of a pneumatic tire, but without making use of an inner pneumatic tube, or springs or other mechanical devices.

The invention consists in the provision of cushion members formed of live, elastic material spaced apart transversely to permit of the displacement of all the members when under pressure or strain, the said members having a rim engaging portion formed of relatively hard material and peripherally split and a tread portion formed of relatively soft resilient material all formed into a unitary structure.

In the accompanying drawings I have illustrated the invention in simple form in which—

Figure 1 is an elevational view of a tire embodying the invention; Fig. 2 a cross-sectional view on line 2—2 of Fig. 1; Fig. 3, a cross-sectional view on line 3—3 of Fig. 2; Fig. 4 a cross-sectional view of a modified form of the invention; Fig. 5 a cross-sectional view of another modified form of the tire and Fig. 6 a cross-sectional view of another modified form of the tire..

The tire, as illustrated in the drawings, is composed of the following elements all vulcanized together into a unitary structure, viz: (*a*) a base or rim-engaging portion; (*b*) a cushioning portion on the base; (*c*) a reinforcing belt or band encircling the periphery of the cushioning portion; (*d*) a breaker strip encircling the reinforcing belt or band; (*e*) a tread encircling the breaker strip and (*f*) a spacing member to space the two members of the base or rim-engaging portion which may or may not be vulcanized thereto.

The base or rim-engaging portion comprises preferably two members 1 and 2, each having a bead 3 formed on its outer face. Each member and its bead is formed of a rubber compound adapted to be vulcanized to a greater degree of hardness than the remainder of the tire. Several layers of fabric 4 are vulcanized to the said members, the fabric extending over the bead 3 and on the face of each member that in use will oppose the rim. This fabric forms not only a protection to the members and the beads but also reinforces the same.

The cushioning portion is formed by the annular side walls 5 and $5^a$ that are formed of rubberized fabric and live, elastic rubber. The fabric 6, of a suitable number of layers, extends along the inner surface of the rim engaging member 1 and may be connected to the fabric 4 at $a$. This fabric then, from said inner surface extends laterally on a curve first in one direction and then in the opposite direction to form substantially the letter S in cross-section; the bow $6^a$ of the fabric being convex relatively to the outer face of the side wall and the bow $6^b$ being concave relatively to said outer face of the wall. Each wall 5, $5^a$ has the same arrangement of the fabric. On the concave face of the bow $6^a$ is the live, elastic rubber in the form of a ring 8, and on the concave side of the bow $6^b$ is the live elastic rubber in the form of a ring 9. A protecting covering of said rubber is applied on the convex sides of both bows $6^a$ and $6^b$. As thus formed and vulcanized each side wall has the appearance in cross-section of the letter S. The fabric 6 in each wall, since it lies between the two cushion rings 8 and 9 and curves over the outer convex surface of the ring 8 and over the inner convex surface of the ring 9, affords great lateral strength to the tire but does not lessen or reduce the resiliency of the same. On the contrary this arrangement of the fabric increases the cushioning quality of the tire. The cushion rings in action resemble the action of a great number of compression springs placed in a similar position, and the fabric acts very much like a double pair of jaws compressing the rubber between them as the tire travels on the road. When the tire is under load or weight pressure or is subjected to the jars and jolts under road use, the live, elastic rubber which forms the cushion rings 8 and 9 is compressed, but when the pressure is released it immediately forces the tire back into its original form.

The spacing member 7 is substantially a split ring formed of suitable material, preferably rubber. It may be vulcanized to one or both of the members of the rim-engaging portion, or it may be separate from either member. Its function is to afford tight clamping of the base or rim-engaging portion to the rim of the wheel and to maintain the two members of said portion in spaced relation. Where the ring is split and not connected to either member of the base portion it is readily inserted in proper position between the members of said portion.

The reinforcing belt or band 10 is formed of several layers of rubberized fabric vulcanized together and to the peripheries of the side walls 5 and 5ª. This belt prevents the tire from excessive spreading in use and also adds greatly to its strength and durability.

The breaker strip 11 is formed of rubberized fabric made by forcing pure gum rubber of suitable thickness through the open weave of a coarse strong fabric. It is vulcanized to the outer face of the reinforcing belt 10 and binds the tread 12 to the said belt and prevents the separation of the tread from the belt.

The tread 12 is formed of a soft, tough, thick, long wearing rubber that is vulcanized to the breaker strip and to the reinforcing belt. An annular groove or slot 13 may be formed in the periphery of the tread and transverse ribs 14 span the groove at selected points. This groove is not essential but when used I have in reality a double tread tied by the transverse ribs and by the breaker strip. The central groove partially relieves the strains or pressure in the central portion of the tire that are incident to the travel of the tire on the road, the strains and pressure being caused thereby to be distributed more directly in line with the side walls or duplex cushion members 5 and 5ª.

Since the side walls or duplex cushion members 5 and 5ª are spaced apart transversely, adequate space is provided between them for the displacement of the cushion members when under pressure or strain, and the cushion members restore the tire to normal shape as the pressure or strain is relieved, as before stated. The layers of fabric 6 in each wall 5, 5ª, that cover the outer surface of the inner cushion ring 8 form practically a crescent that limits the lateral bulging of that portion of the tire outwardly when under compression but readily permits the displacement of the rubber in said cushion inwardly into the space between the two walls. Similarly, since the said fabric also covers the inner surface of the cushion ring 9 and forms practically a crescent that also limits lateral bulging of that portion of the tire inwardly without interfering with the displacement of the rubber in said cushion outwardly, and also permits radial displacement of the belt 10, the breaker strip 11 and the tread 12.

As before stated, the preferably circumferentially split rim-engaging portion, the duplex cushion members or side walls, the reinforcing belt, the breaker strip and the tread are vulcanized into a unitary structure that operates with substantially the same resilience as a pneumatic tire.

The tire hereinbefore described may be mounted on the well known one piece clincher rim or on a two piece or circumferentially split rim. When used in connection with a one piece rim I prefer to form the spacing ring 7 of a suitable elastic rubber that will permit the tire to be pried over the clincher rim, and because of the resilience of the spacing ring the clincher beads 3 will be forced into the grooves of the rim. When the tire is used in connection with a circumferentially split or two-piece rim I prefer to form the spacing ring of hard rubber or other suitable material that will permit the tire to be clamped rigidly onto the rim. This spacing member may also be formed in sections as it need not necessarily be in the form of a ring.

I may omit the annular groove in the tread since this groove is not essential. I may also omit the transverse ribs 14.

Various modifications in the construction of the several parts and in their arrangement will be suggested to one skilled in the art hence I do not wish to be confined to the precise construction and arrangement of parts herein described.

In Figs. 4, 5 and 6, I have illustrated modifications of the cushioning portion. In Fig. 4, instead of making use of the cushion rings 8 and 9 in each wall, I make use of a continuous cushion wall 15 and place the fabric 16 on its inner surface, each wall as before being somewhat S-shaped. In Fig. 5 I omit the reinforcing fabric in each wall 17, the wall being in shape similar to the walls 5 and 15. In Fig. 6 I omit the fabric 6 in each wall 18 and straighten out each said wall rather than make use of the S-shape of the walls 5, 5ª, 15 and 17.

The breaker strip 11 forms a part of the belt 10 and may be omitted if desired.

What I claim is:

1. A vehicle tire comprising a peripherally split rim-engaging portion, means to space the two members of said portion transversely, a cushioning member vulcanized to each said member, a reinforcing belt vulcanized to the outer periphery of each said cushioning member and a tread having a vulcanized connection to the belt.

2. A vehicle tire comprising a peripherally split rim-engaging portion, means to space the two members of said portion transversely, a cushioning member for and vulcanized to each said member and consisting of two annular cushioning rings formed of elastic rubber and a fabric reinforcement covering the outer surface of one of said rings and the inner surface of the other of said rings, a reinforcing belt encircling the peripheral edges of the cushioning members and vulcanized thereto and a tread member having a vulcanized connection to the belt.

3. A vehicle tire comprising a rim-engaging portion formed by two transversely spaced members adapted to encircle a rim, said members being formed of a rubber compound adapted to be vulcanized to a greater degree of hardness than the remainder of the tire, two cushioning members vulcanized to the said members respectively, each cushioning member comprising two rings of soft, elastic rubber forming an upright wall and rubberized fabric encircling the outer surface of one of said rings and encircling the inner surface of the other of said rings, said fabric in vertical cross-section forming substantially the letter S and being vulcanized to said rings and each said wall being vulcanized to its associated rim-engaging portion, a reinforcing fabric belt vulcanized to the peripheral edge of each cushioning member and a tread vulcanized to the belt.

4. A vehicle tire consisting of a tread, a reinforcing fabric belt having a vulcanized connection to the inner periphery of the tread, two annular walls vulcanized to the belt each composed of a plurality of cushioning rings formed of soft elastic rubber and a reinforcing fabric vulcanized to opposite surfaces of the rings, and a rim-engaging member on the inner periphery of each wall and means to space the said rim-engaging members transversely.

5. A vehicle tire consisting of a tread having a central annular groove in its outer periphery and transverse ribs connecting the two annular portions of the tread formed by said groove, a reinforcing member having a vulcanized connection to the inner periphery of the tread, two annular vertically disposed walls formed of soft elastic rings and reinforcing fabric vulcanized at their outer peripheral edges to the reinforcing member, each wall having a rim-engaging member at its inner peripheral edge formed of a rubber compound adapted to be vulcanized to a greater degree of hardness than the remainder of the tire.

6. A vehicle tire comprising a tread, a rim-engaging portion and two laterally spaced annular cushion walls having a vulcanized connection to the tread and to the rim-engaging portion, and supporting the tread on the said portion, each said wall comprising two rings of elastic rubber and fabric between the rings and encircling the outer face of one ring and the inner face of the other ring.

7. A vehicle tire comprising a tread having a central circumferential groove in its outer periphery, a rim-engaging portion and two laterally spaced annular cushion walls having a vulcanized connection to the tread and to the rim-engaging portion, and supporting the tread on the said portion, each said wall comprising two rings of elastic rubber and fabric between the rings and encircling the outer face of one ring and the inner face of the other ring.

In witness whereof I have hereunto subscribed my name this 19th day of December, 1922.

EMIL DEISTER.